(12) United States Patent
Mallinson et al.

(10) Patent No.: US 12,626,050 B2
(45) Date of Patent: May 12, 2026

(54) SEMI-AUTOREGRESSIVE TEXT EDITING

(71) Applicant: Google LLC, Mountain View, CA (US)

(72) Inventors: Jonathan Stephen Mallinson, Zurich (CH); Aliaksei Severyn, Lachen (CH); Eric Emil Malmi, Zurich (CH); Jakub Dominik Adamek, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 624 days.

(21) Appl. No.: 17/751,330

(22) Filed: May 23, 2022

(65) Prior Publication Data

US 2023/0376676 A1 Nov. 23, 2023

(51) Int. Cl.
| | |
|---|---|
| *G06F 40/30* | (2020.01) |
| *G06F 40/117* | (2020.01) |
| *G06F 40/166* | (2020.01) |
| *G06F 40/284* | (2020.01) |
| *G06F 40/40* | (2020.01) |

(52) U.S. Cl.
CPC .......... G06F 40/166 (2020.01); G06F 40/117 (2020.01); G06F 40/284 (2020.01); G06F 40/40 (2020.01)

(58) Field of Classification Search
CPC .......... G06F 40/58; G06F 40/44; G06F 40/45; G06F 40/47; G06N 3/08
See application file for complete search history.

(56) References Cited

U.S. PATENT DOCUMENTS

| | | | | |
|---|---|---|---|---|
| 11,644,961 B1* | 5/2023 | Brdiczka | ............. | G06F 3/04842 |
| | | | | 715/764 |
| 12,045,568 B1* | 7/2024 | Shrivastava | ........ | G10L 15/1815 |
| 12,079,106 B1* | 9/2024 | Hu | ......................... | G06N 3/044 |
| 2019/0303435 A1* | 10/2019 | Herr | ....................... | G06F 16/35 |
| 2020/0364299 A1* | 11/2020 | Niu | ......................... | G06N 3/088 |
| 2021/0019374 A1* | 1/2021 | Donaldson | ............. | G06N 3/084 |
| 2022/0198130 A1* | 6/2022 | Tan | ....................... | G06F 18/214 |
| 2022/0261555 A1* | 8/2022 | Lebanoff | ............... | G06F 40/216 |
| 2023/0090625 A1* | 3/2023 | Zhang | ..................... | G06F 16/35 |
| | | | | 704/9 |
| 2023/0123574 A1* | 4/2023 | Guberman | ............. | G06Q 10/10 |
| | | | | 704/9 |

(Continued)

OTHER PUBLICATIONS

Huang et al. (Huang, SARG: A novel Semi-Autoregressive Generator for Multi-Turn Incomplete Utterance Restoration), 2021 booktitle={Proceedings of the AAAI Conference on Artificial Intelligence}, vol. {35}, No. {14}, pp. 13055--13063, year 2021 (Year: 2021).*

(Continued)

*Primary Examiner* — Lamont M Spooner
(74) *Attorney, Agent, or Firm* — DORITY & MANNING, P.A.

(57) ABSTRACT

Provided are improved machine learning-based text editing models. Specifically, example implementations include a flexible semi-auto-regressive text-editing approach for generation, designed to derive the maximum benefit from non-auto-regressive text-editing and autoregressive decoding. In contrast to conventional sequence-to-sequence (seq2seq) models, the proposed approach is fast at inference time, while being capable of modeling flexible input-output transformations.

20 Claims, 7 Drawing Sheets

(56) References Cited

U.S. PATENT DOCUMENTS

| | | | | |
|---|---|---|---|---|
| 2023/0137209 A1* | 5/2023 | Nangi | .................. | G06F 40/166 |
| | | | | 704/9 |
| 2023/0237277 A1* | 7/2023 | Reza | .................... | G06F 40/186 |
| | | | | 704/9 |
| 2023/0267285 A1* | 8/2023 | Wu | ...................... | G06F 40/166 |
| | | | | 704/2 |
| 2023/0335126 A1* | 10/2023 | Huang | .................... | G10L 15/16 |
| 2024/0161730 A1* | 5/2024 | Elias | .................... | G06N 3/0455 |

OTHER PUBLICATIONS

Lin, CommonGen: A Constrained Text Generation Challenge for Generative Commonsense Reasoning).journal={arXiv preprint arXiv:1911.03705}, 2019, pp. 1-18 (Year: 2019).*

Zaidi et al., From Autoregressive to Non-Autoregressive: Studies on Text Generation in Neural Sequence Models, school={Monash University}, Apr. 2022, pp. 1-130 (Year: 2022).*

Kasner et al., title={Data-to-text generation with iterative text editing}, journal={arXiv preprint arXiv:2011.01694}, year={2020}, pp. 1-11 (Year: 2020).*

Gu et al., title={Levenshtein transformer}, journal={Advances in neural information processing systems}, vol. {32}, year={2019}, pp. 1-11 (Year: 2019).*

Gu et al., title={Insertion-based decoding with automatically inferred generation order}, journal={Transactions of the Association for Computational Linguistics}, vol. {7}, pp. {661--676}, year={2019}, publisher={MIT Press One Rogers Street, Cambridge, MA 02142-1209, USA journals-info~. . . (Year: 2019).*

Sander et al., Sinkformers: Transformers with Doubly Stochastic Attention, Jan. 2022, pp. 1-16, arXiv:2110.11773 [cs.LG] (Year: 2022).*

Alva-Manchego et al., "Learning How to Simplify from Explicit Labeling of Complex-Simplified Text Pairs." In Proceedings of the Eighth International Joint Conference on Natural Language Processing. (vol. 1: Long Papers), Nov. 27-Dec. 1, 2017, Taipei, Taiwan, pp. 295-305.

Awasthi et al., "Parallel Iterative Edit Models for Local Sequence Transduction." In Proceedings of the 2019 Conference on Empirical Methods in Natural Language Processing and the 9th International Joint Conference on Natural Language Processing, 2019, Hong Kong, China, pp. 4260-4270.

Bryant et al., "The BEA-2019 Shared Task on Grammatical Error Correction." In Proceedings of the Fourteenth Workshop on Innovative Use of NLP for Building Educational Applications, 2019, Florence, Italy, pp. 52-75.

Eunsol et al., "Decontextualization: Making Sentences Stand-Alone." Transactions of the Association for Computational Linguistics, vol. 9, 2019, pp. 447-461.

Dong et al., "EditNTS: An Neural Programmer-Interpreter Model for Sentence Simplification Through Explicit Editing." In Proceedings of the 57th Annual Meeting of the Association for Computational Linguistics, 2019, Florence, Italy, pp. 3393-3402.

Geva et al., "Discofuse: A Large-Scale Dataset for Discourse-Based Sentence Fusion.", In Proceedings of the 2019 Conference of the North American Chapter of the Association for Computational Linguistics: Human Language Technologies, vol. 1 (Long and Short Papers), 2019, Minneapolis, Minnesota, pp. 3443-3455.

Kiyono et al., "An Empirical Study of Incorporating Pseudo Data into Grammatical Error Correction.", arXiv preprint arXiv:1909. 00502v1, Sep. 2, 2019, 13 pages.

Liu et al., "Incomplete Utterance Rewriting as Semantic Segmentation.", In Proceedings of the 2020 Conference on Empirical Methods in Natural Language Processing (EMNLP),2020, pp. 2846-2857.

Mallinson et al., "FELIX: Flexible Text Editing Through Tagging and Insertion." In Findings of the Association for Computational Linguistics: EMNLP, 2020, pp. 1244-1255.

Malmi et al., "Encode, Tag, Realize: High-Precision Text Editing." In Proceedings of the 2019 Conference on Empirical Methods in Natural Language Processing and the 9th International Joint Conference on Natural Language Processing, 2019, pp. 5054-5065.

Malmi et al., 2020. "Unsupervised Text Style Transfer with Padded Masked Language Models." In Proceedings of the 2020 Conference on Empirical Methods in Natural Language Processing, 2020, pp. 8671-8680.

Mena et al., 2018. "Learning Latent Permutations with Gumbel-Sinkhorn Networks." arXiv:1802.08665v1, Feb. 23, 2018, 22 pages.

Mizumoto et al., "Mining Revision Log of Language Learning SNS for Automated Japanese Error Correction of Second Language Learners.", In Proceedings of 5th International Joint Conference on Natural Language Processing, 2011, pp. 147-155.

Omelianchuk et al., "GECTOR—Grammatical Error Correction: Tag, Not Rewrite." In Proceedings of the Fifteenth Workshop on Innovative Use of NLP for Building Educational Applications, 2020, Seattle, WA, pp. 163-170.

Raffel et al., "Exploring the Limits of Transfer Learning with a Unified Text-To-Text Transformer.", arXiv preprint arXiv:1910. 10683v3, Jul. 28, 2020, 67 pages.

Rothe et al., "A Simple Recipe for Multilingual Grammatical Error Correction.", Proceedings of the 59th Annual Meeting of the Association for Computational Linguistics and the 11th International Joint Conference on Natural Language Processing (vol. 2: Short Papers), 2021, pp. 702-707.

Rothe et al., "Leveraging Pre-Trained Checkpoints for Sequence Generation Tasks." Transactions of the Association for Computational Linguistics, 2019, pp. 264-280.

Stahlberg et al., "Seq2edits: Sequence Transduction Using Span-Level Edit Operations.", arXiv:2009.11136v1, Sep. 23, 2020, 17 pages.

Vaswani et al., "Attention is All You Need. In Advances in Neural Information Processing Systems.", 30: Annual Conference on Neural Information Processing Systems, Dec. 4-9, 2017, Long Beach, CA, pp. 5998-6008.

Vinyals et al., "Pointer Networks. In Advances in Neural Information Processing Systems" 28: Annual Conference on Neural Information Processing Systems, Dec. 7-12, 2015, Montreal, Quebec, pp. 2692-2700.

Yannakoudakis et al., "A New Dataset and Method for Automatically Grading ESOL Texts." In Proceedings of the 49th Annual Meeting of The Association for Computational Linguistics: Human Language Technologies, 2011, pp. 180-189.

* cited by examiner

60

Training Example:
Source Text String
Target String
Ground Truth Ordering
Ground Truth Labels

66

Insertion Loss

Output Text String    16

64

Pointing Loss

Ordering    20b

Decoder    22

Pointing Model

28

62

20a

Tagging Loss

Discard/Keep Labels

Tagging Model

27

Text Embedding Model

26

Source Text String

14

50

SEMI-AUTOREGRESSIVE TEXT EDITING

FIELD

The present disclosure relates generally to improved machine learning-based text editing models. More particularly, example aspects of the present disclosure relate to sequence to sequence models that combine a text editing task with a text generation task.

BACKGROUND

A number of machine learning-based solutions to the task of text-to-text transduction have been proposed in the art. As one example, T5 (Raffel, Colin et al. "Exploring the Limits of Transfer Learning with a Unified Text-to-Text Transformer." ArXiv abs/1910.10683 (2020)) is a sequence to sequence ("seq2seq") model pre-trained on span in-filling. Other pre-trained seq2seq models, such as BART (Lewis, Mike et al. "BART: Denoising Sequence-to-Sequence Pre-training for Natural Language Generation, Translation, and Comprehension." ACL (2020)) and MASS (Song, Kaitao et al. "MASS: Masked Sequence to Sequence Pre-training for Language Generation." ICML (2019)) represent the current standard for text-to-text transduction.

However, while seq2seq frameworks offer a generic tool for modeling almost any kind of text-to-text transduction, there are still many real-world tasks where generating target texts completely from scratch—as is done with seq2seq approaches—is often wasteful and leads to unnecessarily high latency at inference time. This is especially true for monolingual settings where input and output texts have relatively high degrees of overlap.

In such cases an alternative approach is to cast conditional text generation as a text-editing task, where the model learns to reconstruct target texts by applying a set of edit operations to the inputs. Typically, the set of edit operations is fixed and pre-defined ahead of time. This leads to higher sample-efficiency as the limited set of allowed operations significantly reduces the search space. However, choosing from only a limited set of edit operations limits the flexibility of the model to reconstruct arbitrary output texts from their inputs, often reducing the quality of the resulting output texts.

SUMMARY

Aspects and advantages of embodiments of the present disclosure will be set forth in part in the following description, or can be learned from the description, or can be learned through practice of the embodiments.

One example aspect of the present disclosure is directed to a computer system that performs text editing. The computer system includes one or more processors. The computer system includes a machine-learned text editing model configured to receive and process a source text string to generate an output text string. The output text string comprises an edited version of the source text string. The machine-learned text editing model comprises: an encoder model configured to process the source text string to generate an intermediate text representation. The source text string comprises a plurality of source tokens. The intermediate text representation indicates: (1) a subset of the plurality of source tokens to be maintained for the output text string and (2) an ordering of the subset of the plurality of source tokens to be maintained for the output text string. The machine-learned text editing model comprises: a decoder model configured to process the intermediate text representation to select one or more additional tokens to insert into the subset of the plurality of source tokens to generate the output text string. The computer system includes one or more non-transitory computer readable media that store instructions that, when executed by the one or more processors, cause the computer system to perform operations. The operations comprise: obtaining the source text string; processing the source text string with the machine-learned text editing model to generate the output text string; and providing the output text string as an output.

Another example aspect of the present disclosure is directed to a computer-implemented method to train a text editing model. The method includes obtaining, by a computing system comprising one or more computing devices, a training example comprising an source text string and target text string. The method includes processing, by the computing system, the source text string with the text editing model to generate an output text string. Processing the source text string with the text editing model to generate the output text string comprises: processing, by the computing system, the source text string with an encoder model of the text editing model to generate an intermediate text representation, wherein the source text string comprises a plurality of source tokens, and wherein the intermediate text representation indicates: (1) a subset of the plurality of source tokens to be maintained for the output text string and (2) an ordering of the subset of the plurality of source tokens to be maintained for the output text string. Processing the source text string with the text editing model to generate the output text string comprises processing, by the computing system, the intermediate text representation with a decoder model of the text editing model to select one or more additional tokens to insert into the subset of the plurality of source tokens to generate the output text string. The method includes evaluating, by the computing system, a loss function that compares (i) one or more of: a set of ground truth labels for the source tokens to be maintained, a ground truth ordering, and the target text string to (ii) one or more of: the subset of the plurality of source tokens, the ordering of the subset of the plurality of source tokens, and the output text string. The method includes modifying, by the computing system, one or more parameters of the text editing model based on the loss function.

Another example aspect of the present disclosure is directed to one or more non-transitory computer readable media that store a machine-learned text editing model configured to receive and process a source text string to generate an output text string, the output text string comprising an edited version of the source text string. The machine-learned text editing model comprises: an encoder model configured to process the source text string to generate an intermediate text representation, wherein the source text string comprises a plurality of source tokens, and wherein the intermediate text representation indicates: (1) a subset of the plurality of source tokens to be maintained for the output text string and (2) an ordering of the subset of the plurality of source tokens to be maintained for the output text string. The machine-learned text editing model comprises: a decoder model configured to process the intermediate text representation to select one or more additional tokens to insert into the subset of the plurality of source tokens to generate the output text string.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
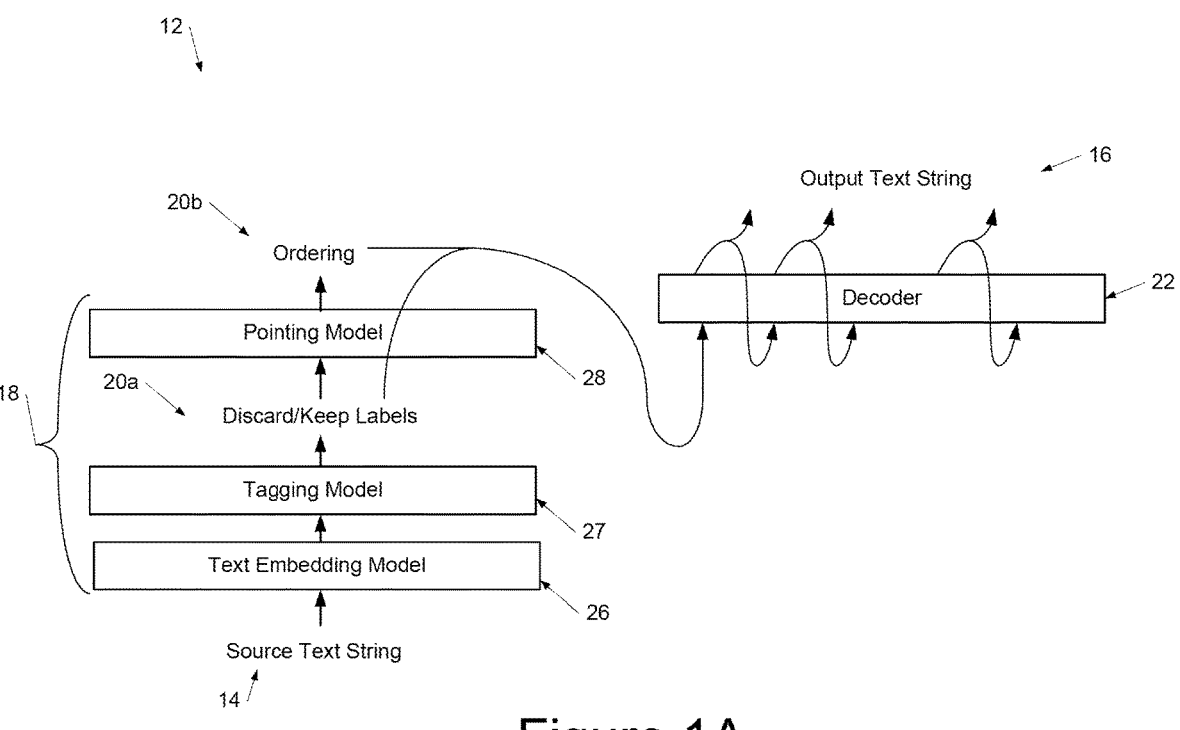
FIG. 1A shows a graphical diagram of an example text editing model according to example embodiments of the present disclosure.

Reference numerals that are repeated across plural figures are intended to identify the same features in various implementations.

DETAILED DESCRIPTION

Overview

Generally, the present disclosure is directed to improved machine learning-based text editing models. Specifically, example implementations of the present disclosure include a flexible semi-auto-regressive text-editing approach for generation, designed to derive the maximum benefit from non-auto-regressive text-editing and autoregressive decoding. Example implementations of the proposed approach can be referred to as "EdiT5". In contrast to conventional sequence-to-sequence (seq2seq) models, the proposed approach is fast at inference time, while being capable of modeling flexible input-output transformations.

Example implementations achieve these benefits by decomposing text generation into two sub-tasks: tagging to decide on the subset of input tokens and their order in the output text; and insertion to in-fill the missing tokens in the output not present in the input. The tagging and re-ordering, which are able to generate the majority of the output, are applied non-autoregressively, whereas the insertion, the small number of output tokens which do not appear in the input, is generated using an auto-regressive decoder, which attends over the input and the text-editing operations.

The systems and methods of the present disclosure provide a number of technical effects and benefits. As one example, the proposed models significantly reduce inference latency, being 20× faster than a T5 seq2seq model. For example, example implementations of the present disclosure are able to perform a Grammatical Error Correction task in under 2 ms. By performing inference faster, computational resources such as processor cycles, memory space, and/or network bandwidth can be preserved. In addition, the proposed approaches enable a text editing model to generate high quality outputs on a number of tasks, including, as examples, Sentence Fusion, Grammatical Error Correction, translation (e.g., monolingual translation), and decontextualization. Thus, the proposed techniques improve the performance of a computer itself on various tasks.

More particularly, by combining text-to-text with text-editing, the present disclosure provides an approach which is both low latency and flexible, able to generate arbitrary rewrites. Specifically, example aspects are directed to a novel text-editing framework (e.g., example implementations of which can be referred to as 'EdiT5'). The framework leverages in a novel way T5's ability to perform span in-filling via self-supervised pre-training.

In particular, the proposed framework provides the following benefits:

Fast inference time. Achieving low latencies when serving text generation models typically requires specialized hardware and finding a trade-off between model size and accuracy. One of the major reasons for slow inference times is that text generation models typically employ an autoregressive decoder, i.e., output texts are generated in a sequential non-parallel fashion. To ensure faster inference times, example implementations of the present disclosure keep the majority of the model non-autoregressive.

Flexible and powerful text editing. While simplifying the learning task, text editing models are not as powerful as general purpose sequence-to-sequence approaches when it comes to modeling arbitrary input output text transductions. Hence, example implementations of the present disclosure take advantage of the power of an autoregressive decoder to insert those words which do not appear in the source sequence.

Specifically, according to an aspect of the present disclosure, the text editing task can be decomposed it into two sub-problems: tagging and insertion. Each problem can be modeled with a separate sub-model of the proposed text editing model:

An encoder (e.g., a "tagger") can decide which source tokens to preserve and in which order they appear in the output, thus allowing for arbitrary word reordering. One example non-autoregressive tagger is a Transformer-based network that implements a novel pointing mechanism combined with sinkhorn layers.

A decoder (e.g., implemented as an "insertion sub-model") can insert words which are present in the target sequence but do not appear in the source sequence. This sub-model can in some implementations be based on an autoregressive transformer decoder, attending to the source sequences and its edits, and predicting where new tokens should be inserted and what these tokens are. This task is similar to the T5 span in-filling pre-training.

With reference now to the Figures, example embodiments of the present disclosure will be discussed in further detail.

Example Models

Example Model Overview

Example models described herein can include two sub-models: an encoder, which is tasked with encoding the source sentence and performing non-autoregressive text-editing operation, and a decoder which attends to the output of the encoder, including the edit operations, and autoregressively inserts target tokens which do not appear within the source sentence. As such, some example proposed models generate an output sequence y from an input x as follows:

$$P(y \mid x) := \left( \prod_{i}^{|y^d|} P\big(y_i^d \mid y_{<i}^d, y', \pi, x\big) \right) * P(\pi \mid x, y') * P(y' \mid x) \qquad (1)$$

The last two terms correspond to the encoder text-editing operations and the first term corresponds to the decoder insertion sub-model. $y'$ represents the edit tags, that is, whether a word from the source sentence appears in the target sentence or not. $\pi$ represents a permutation of the source tokens. $y^d$, represents the output of the insertion model.

As an example, FIG. 1A shows a graphical diagram of an example text editing model 12 according to example embodiments of the present disclosure. The text editing model 12 can be configured to receive and process a source text string 14 to generate an output text string 16. The output text string 16 can be an edited version of the source text string 14

As illustrated in FIG. 1, the text editing model 12 can include an encoder model 18 that is configured to process the source text string 14 to generate an intermediate text representation 20a-b.

The source text string 12 can include a plurality of source tokens. The intermediate text representation 20a-b can indicate: (1) a subset of the plurality of source tokens to be maintained for the output text string (e.g., using discard/keep labels 20a) and (2) an ordering 20b of the subset of the plurality of source tokens to be maintained for the output text string.

The text editing model 12 can also include a decoder model 22 configured to process the intermediate text representation 20 to select one or more additional tokens to insert into the subset of the plurality of source tokens to generate the output text string 16.

In some implementations, the encoder model 18 is configured to process the source text string 14 in a non-autoregressive manner. In some implementations, the decoder model is configured to process the intermediate text representation in an autoregressive manner.

In some implementations, the encoder model 18 can include: a text embedding model 26 configured to process the source text string 14 to generate a hidden representation. In some implementations, the encoder model 18 can also include a tagging model 27 configured to assign a respective tag 20a to each of the source tokens in the source text string. The respective tag 20a for each source token can indicate whether or not such source token is included in the subset of the plurality of source tokens to be maintained for the output text string.

In some implementations, the encoder model 18 can also include a pointer model 28 configured to generate the ordering 20b of the subset of the plurality of source tokens to be maintained for the output text string based at least in part on the hidden representation and the respective tag assigned to each of the source tokens by the text embedding model 26 and the tagging model 27, respectively.

In some implementations, each of the encoder model 18 and the decoder model 22 can be or include a transformer neural network. As one example, at least the transformer neural network in the decoder model 22 can be or include a T5 pre-trained transformer neural network that has been pre-trained to insert missing spans. For example, the decoder model 22 may consist of only a single T5 decoder transformer layer. In some implementations, the decoder model 22 (e.g., the single decoder transformer layer) may have been additionally pre-trained with a denoising objective.

Figure 1B:
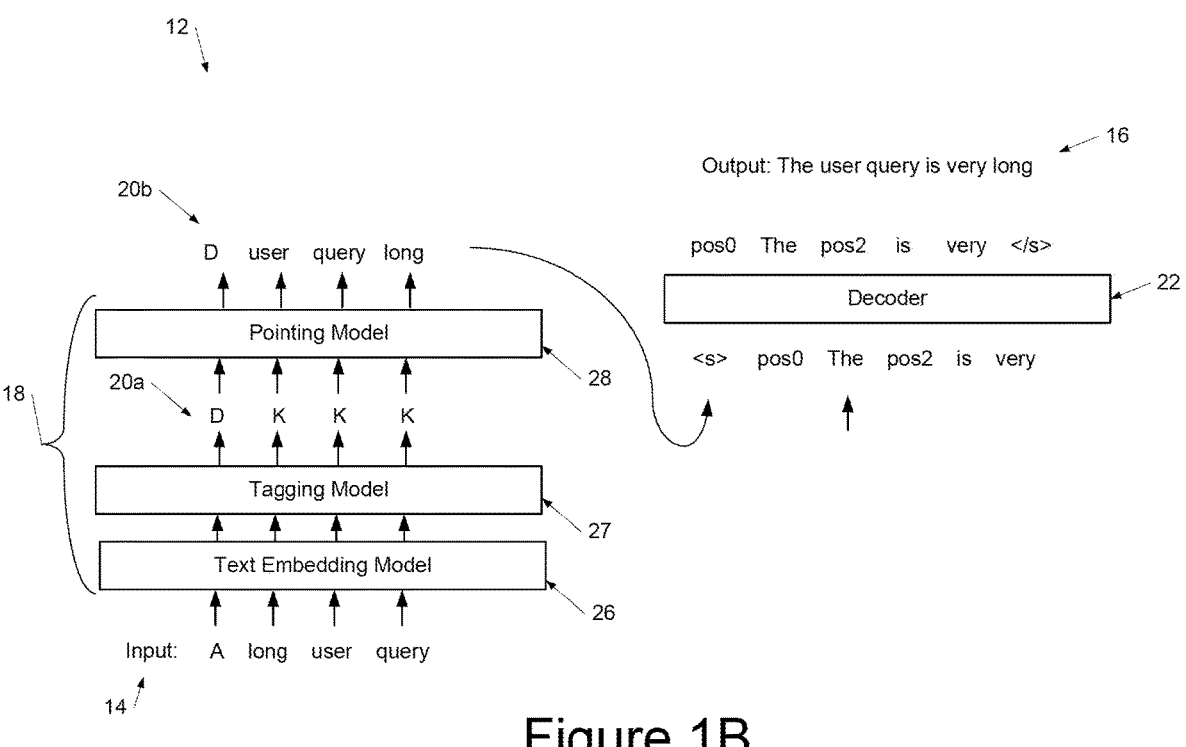
FIG. 1B shows a graphical diagram of an example application of an example text editing model according to example embodiments of the present disclosure.

FIG. 1B shows an example application of the architecture shown in FIG. 1A to an example input text string. In FIG. 1B, the input text string "A long user query" is first tagged with discard/keep labels 20a and then assigned an ordering 20b, shown as "[Discard], user, query, long". Next, the decoder model 22 autoregressively processes the intermediate representation to generate the output string 16, shown as "The user query is very long".

Figure 1C:
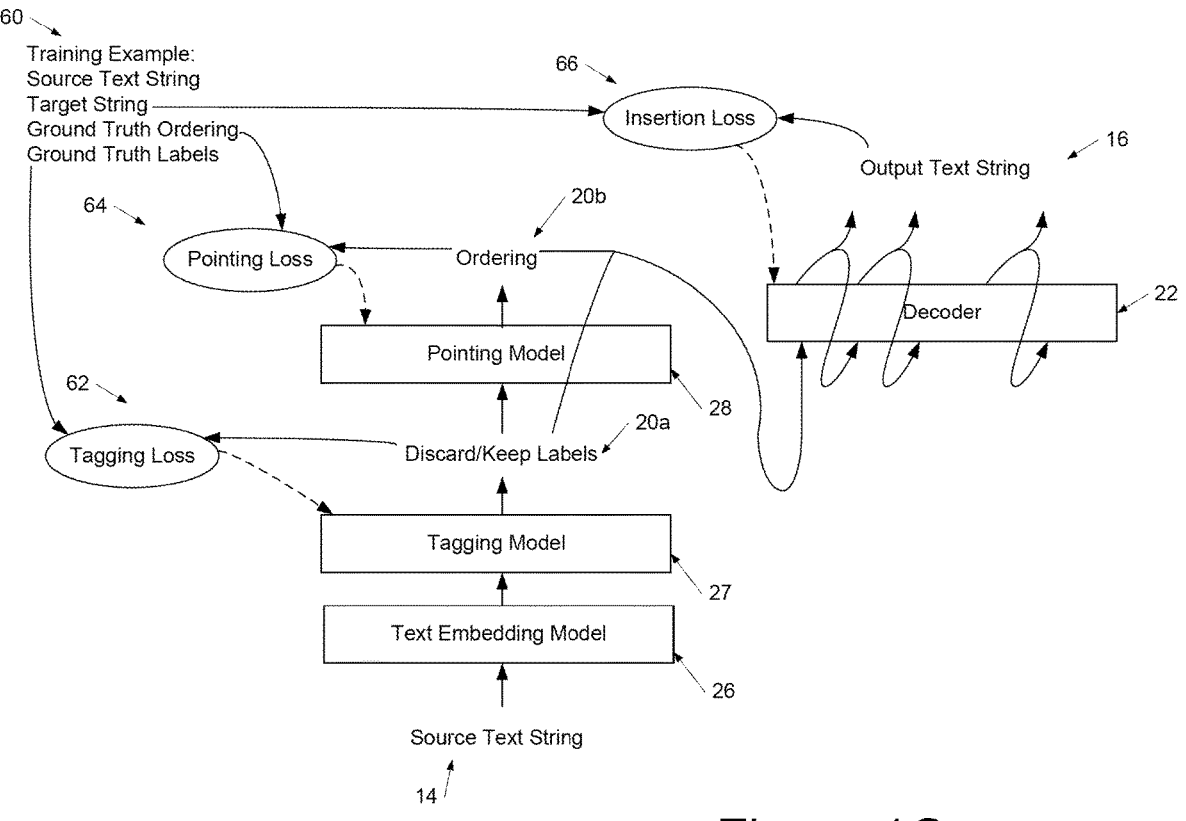
FIG. 1C shows a graphical diagram of an example approach to train an example text editing model according to example embodiments of the present disclosure.

FIG. 1C shows an example approach to train the model. Specifically, in FIG. 1C, a training example 60 can be obtained. The training example 60 can include: the source text string, a target string, a ground truth ordering, and ground truth labels. A number of loss functions can be evaluated. As examples, as shown in FIG. 1C, a tagging loss 62 can compare the ground truth labels to the discard/keep labels 20a; a pointing loss 64 can compare the ground truth ordering to the ordering 20b; and/or an insertion loss 66 can compare the target string to the output text string. The loss functions 62, 64, 66 can be back propagated through the model to train the model.

Additional example details of example implementations of the example model illustrated in FIG. 1 are now provided.

Example Text-Editing Encoder

In some example implementations, a text editing encoder can be implemented in or include components for three steps: (1) Encoding (e.g., using a text embedding model); (2) Tagging (e.g., using a tagging model); and (3) Pointing (e.g., using a pointer model). Each of these steps is described in further detail below.

Encoder: In some implementations, the source sentence x is first encoded (e.g., using N transformer layers) into the hidden representation h. For example, the source sentence can be first encoded using a 12-layer T5 encoder. In some implementations, the text embedding model can be a pre-trained model.

Tagging: A tag sequence $y'$ can be constructed as follows: source tokens that must be copied are assigned the KEEP tag (K); tokens not present in the output are marked by the DELETE tag (D). Tags can be predicted as a classification output (e.g., a binary classification output) generated from the output of the encoder $h^L$. In one example, the tagging model can include a single transformer layer followed by a feed-forward layer.

One example loss for the tagging model (and optionally flowing back to the embedding model as well) is a cross-entropy loss, for example, as follows:

$$\mathcal{L}_{tagging} = \sum_{j}^{|x|} \log P\big(y_j' \mid (f_t(h))_j\big) \qquad (2)$$

where, in Eq. (2), $y'$ are the gold tags from a labelled example, j is the index of the source token, and $f_t$ is the tagging model. In some implementations, during inference, argmax can be used to determine the tags, whereas during training the gold tags are used to determine the loss signal.

The encoder hidden state can then be updated to take into account the tags selected during inference:

$$h_j^t = f_{te}([h_j; e(y_j^t)])$$ (3)

where e is a tag embedding layer, which is then concatenated to the original hidden representation of the source sequence, before being shrunk back down to the original dimension using a feed-forward layer $f_{te}$.

Pointing: Some implementations of the proposed approach explicitly model word reordering to allow for larger global edits, as well as smaller local changes, such as swapping nearby words (e.g., John and Mary→Mary and John). Without this word reordering step, a vanilla text editing model based on just tagging would first need to delete a span ('and Mary') and then insert 'Mary and' before 'John'.

In contrast, example implementations of the present disclosure are able to model this without the need for deletions or insertions. Given a sequence x and the predicted tags $y^t$, the re-ordering model generates a permutation Tr.

Some example implementations can be based on or resemble a pointer network. See Oriol Vinyals, Meire Fortunato, and Navdeep Jaitly. 2015. Pointer networks. In Advances in Neural Information Processing Systems 28: Annual Conference on Neural Information Processing Systems 2015, Dec. 7-12, 2015, Montreal, Quebec, Canada, pages 2692-2700.

Figure 2:
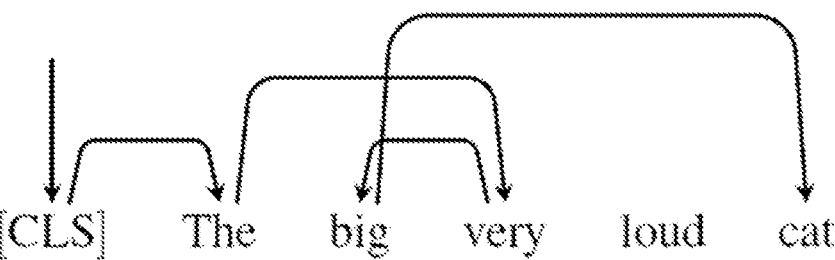
FIG. 2 shows a graphical diagram of example pointing operations according to example embodiments of the present disclosure.

In a pointer network, an attention mechanism points to the next token. Unlike previous approaches where a decoder state attends over an encoder sequence, the proposed setup can apply intra-attention, where source tokens attend to all other source tokens. As such the output of this model is a series of predicted pointers (source token→next target token). π can easily be constructed by daisy-chaining the pointers together, as seen in FIG. 2. Specifically, FIG. 2 shows the application of an example pointing mechanism to transform "the big very loud cat" into "the very big cat".

Some example implementations of the present disclosure can calculate attention using key-query attention. For example, an additional transformer layer can be included prior to the key network:

$$\alpha_{k,j} = f^q(h^t)_j \cdot f^k(h^t)_k$$ (4)

where $\alpha_{k,j}$ is the un-normalized attention, $f^q$ is the query network, a single feed-forward layer, and $f^k$ is the key network, a transformer layer followed by a single feedfoward layer.

To ensure a valid permutation is formed, i.e. no token is pointed to twice, some example implementations can use sinkhorn layers, which normalizes over both the rows and the column of the intra-pointer attention α. Sinkhorn layers are described at Gonzalo Mena, David Belanger, Scott Linderman, and Jasper Snoek. 2018. Learning latent permutations with Gumbel-sinkhorn networks. arXiv preprint arXiv:1802.08665.

The application of the Sinkhorn layers can be defined as:

$$S^0 = \exp(\alpha)$$ (5)

$$S^i = T_c(T_r(S^{i-1}(\alpha)) \text{ where}$$ (6)

$$T_c^{j,k}(X) = \frac{x_{j,k}}{\sum_l xl, j}$$

is the column normalization operator and $$T_r^{j,k}(X) = \frac{x_{j,k}}{\sum_l xj, l}$$

is the row normalization operator.

Thus, S(α) can correspond to a sinkhorn layer applied to an attention matrix, where the attention matrix provides a probability of each word pointing to each other word.

One example loss for the pointing network is defined as:

$$\mathcal{L}_{pointing} = CE(\pi|S(\alpha))$$ (7)

where, in Eq. (7), CE is the cross-entropy loss, and π is the ground truth permutation of the training example. During inference, argmax can be used to determine π, whereas during training a gold permutation can be obtained from a labelled example for use in evaluating the loss.

The hidden states ($h^r$) can be updated to account for the reordering generated during inference. For example, positional embeddings can be used to update the hidden states with their new position (offset from 0). For example if John and Mary was reordered into Mary and John, the position information would be updated as 2John 1and 0Mary, as so:

$$h^p = (h^t + e_p(\pi))$$ (8)

where $e_p$ are learnt absolute positional embedding and π is the permutation generated at inference. Positional embeddings are masked out for those source words which do not appear in the target sequence.

In some implementations, an additional transformer encoder layer can be applied to $h^p$ to form the final encoded representation of the sequence $h^f$. $h^f$ captures the edits as well as the original sequence x, and the decoder attends to this representation.

Example Text-Editing Decoder

The decoder can be tasked with inserting tokens which are in the output but don't appear within the input. In one example, the decoder can be or include a transformer neural network. In some of such implementations, the proposed models can take advantage of the pre-training of a T5 model, where the T5 was pre-trained to insert missing spans. When pre-training, T5 uses special tokens span_i to indicate where missing spans should be inserted.

Some example implementations of the present disclosure can re-purpose these special tokens, using them to indicate at which position new tokens should be inserted. I.e. span_1, indicates that the tokens should be inserted after the first token. As such the decoder can first decode a special position token and then decode the inserted tokens which should appear after this token.

In some implementations, the decoder can be trained with a standard cross-entropy loss:

$$\mathcal{L}_{insertion} = \sum_{i}^{|y^d|} \log P(y_i^d \mid y_{<i}^d, h^f) \tag{9}$$

where, in Eq. (9), i is the decoder index and $y_i^d$ is the ground truth token associated with the training example. The loss for the entire model can then, in some implementations, be defined as the sum of the three individual losses:

$$\mathcal{L} = \lambda_1 \mathcal{L}_{tagging} + \lambda_2 \mathcal{L}_{pointing} + \lambda_3 \mathcal{L}_{insertion} \tag{10}$$

where $\lambda$ is a hyper-parameter.

Example Pretraining

To further reduce latency of the proposed models, some implementations can use a single decoder transformer layer, as a 12 layer decoder per step adds over 1 ms of latency when compared to a single layer. As the majority of the output is constructed using the encoder text-editing operations, the decoder needs to be less powerful.

While some implementations initialize the text editing model from T5 base, T5 was pre-trained with 12 decoder layers. As such some implementations perform additional pre-training to account for this. For example, some implementations use a pre-training objective which combines a T5 style span insertion task, with a denoising task, as used in BART. Where a source sentence is corrupted; spans are dropped, swapped, and added. By introducing noise we are able to train the tagger to detect incorrect spans, and the pointer to reorder the sentence. The decoder then behaves like the T5 pre-training objective inserting the content of missing spans. Unlike BARTs pre-training, the proposed approach is computationally cheap, as the decoder does not decode the entire sequence when training, instead just decoding the missing spans.

Example Dataset Construction

When constructing the training dataset, there are many possible combinations of $\pi$ and $y^t$ which could produce y. For instance, all source tokens could be deleted, and the decoder could then decode all the target tokens. However, a general objective is to minimize the number of edits, particularly minimizing the amount of inserted tokens and maximizing the number of kept tokens. By minimizing the number of inserted tokens, the latency of the model can also be minimized as the decoder needs to run for fewer decoding iterations. An additional benefit is the risk of introducing hallucinations is also minimized.

In addition, some implementations can produce alignments from target characters against source tokens. By aligning target characters the text editing model can add prefixes or suffixes to source tokens. As such some implementations are able to transform 'run' to the target token 'runs' by keeping run and then decoding s.

When producing alignments, some implementations maximize keeping the largest continuous spans of tokens. As such, if the same target token appears multiple times in the source sentence, the model can point to the source token which would produce the largest continuous span. On the other hand, if a target tokens appears multiple times in the target sentence and once in the source sentence, some implementations can point to the source token which produces the largest continuous span, whereas the other instances are inserted by the decoder.

Example Devices and Systems

Figure 3A:
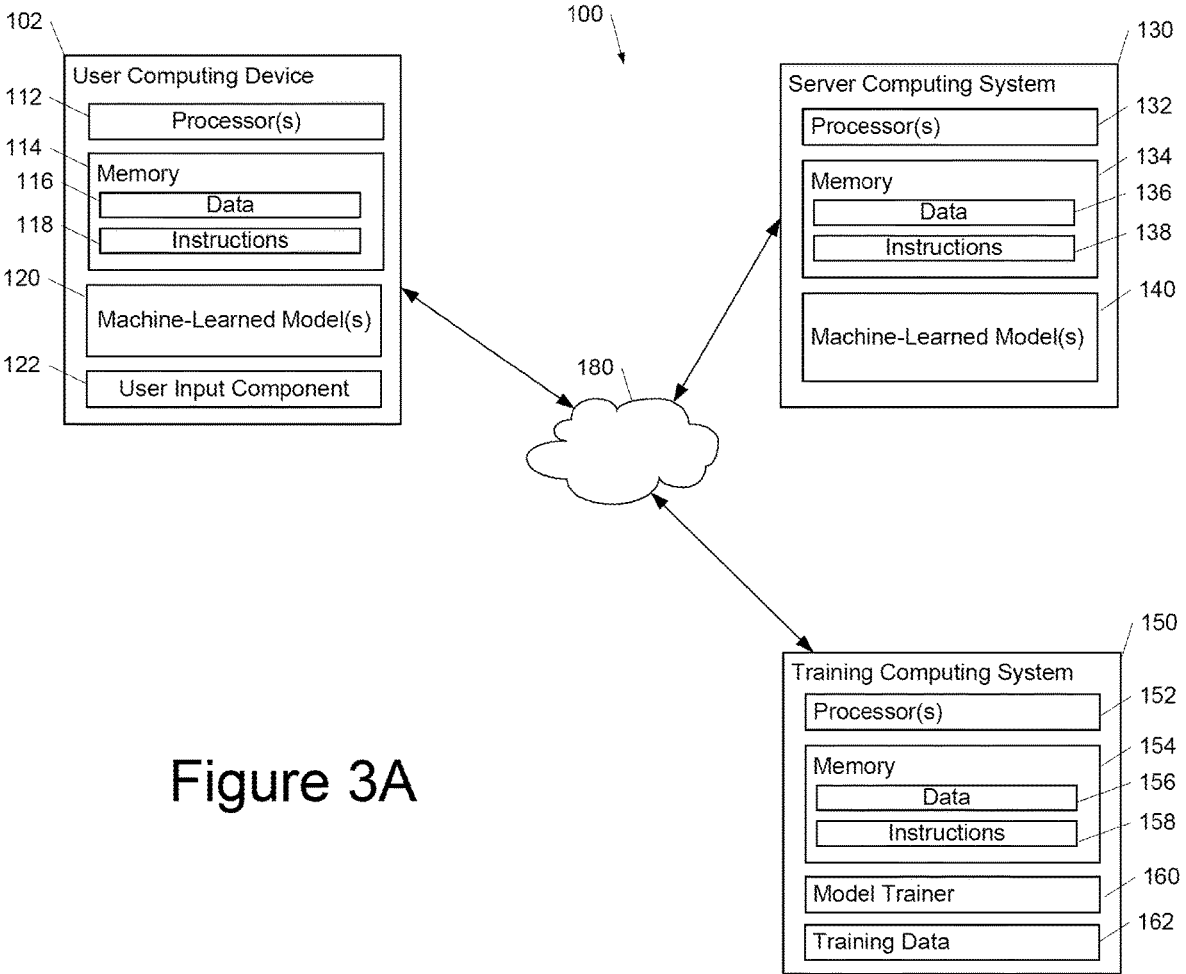
FIG. 3A depicts a block diagram of an example computing system according to example embodiments of the present disclosure.

FIG. 3A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more text editing models 120. For example, the text editing models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example text editing models 120 are discussed with reference to FIGS. 1A-C.

In some implementations, the one or more text editing models 120 can be received from the server computing system 130 over network 180, stored in the user computing device memory 114, and then used or otherwise implemented by the one or more processors 112. In some implementations, the user computing device 102 can implement multiple parallel instances of a single text editing model 120 (e.g., to perform parallel text editing across multiple instances of source strings).

Additionally or alternatively, one or more text editing models 140 can be included in or otherwise stored and implemented by the server computing system 130 that communicates with the user computing device 102 according to a client-server relationship. For example, the text editing models 140 can be implemented by the server computing system 140 as a portion of a web service (e.g., a text editing service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more text editing models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 1A-C.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the text editing models 120 and/or 140 based on a set of training data 162. The training data 162 can include, for example, pairs of source text strings and target text strings.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 3A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 3B:
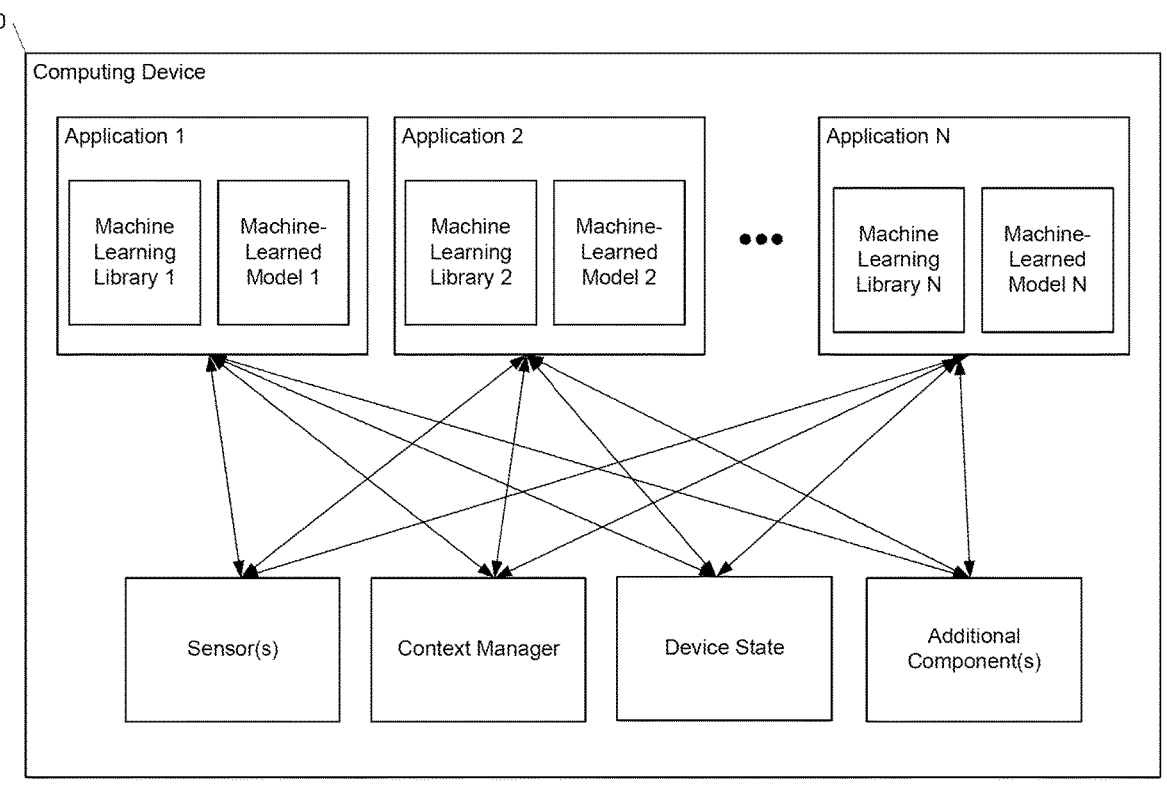
FIG. 3B depicts a block diagram of an example computing device according to example embodiments of the present disclosure.

FIG. 3B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 3B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 3C:
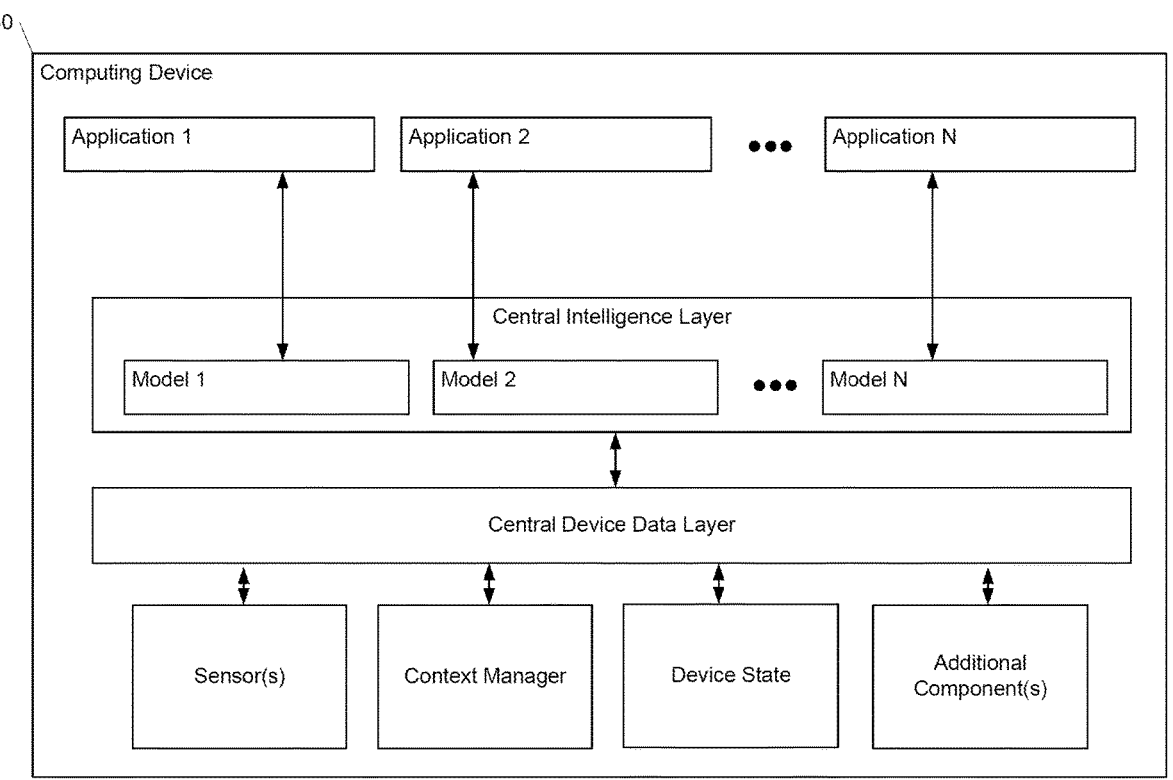
FIG. 3C depicts a block diagram of an example computing device according to example embodiments of the present disclosure.

FIG. 3C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 3C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 3C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer system that performs text editing, the computer system comprising:

one or more processors;

a machine-learned text editing model configured to receive and process a source text string to generate an output text string, the output text string comprising an edited version of the source text string, the machine-learned text editing model comprising:

an encoder model configured to process the source text string in a non-autoregressive manner to generate an intermediate text representation, wherein the source text string comprises a plurality of source tokens, and wherein the intermediate text representation indicates: (1) a subset of the plurality of source tokens to be maintained for the output text string and (2) an ordering of the subset of the plurality of source tokens to be maintained for the output text string; and a decoder model configured to process the intermediate text representation in an autoregressive manner to select one or more additional tokens to insert into the subset of the plurality of source tokens to generate the output text string, wherein the decoder model is configured to first predict a position token indicating a position at which one or more of the additional tokens should be inserted into the intermediate text representation and then to second predict the one or more of the additional tokens to be inserted into the intermediate text representation at the position;

wherein the encoder model is configured to process the source text string in the non-autoregressive manner to generate the intermediate text representation without indicating the position at which one or more of the additional tokens should be inserted into the intermediate text representation; and one or more non-transitory computer readable media that store instructions that, when executed by the one or more processors, cause the computer system to perform operations, the operations comprising:

obtaining the source text string;

processing the source text string with the machine-learned text editing model to generate the output text string; and providing the output text string as an output.

2. The computer system of claim 1, wherein the encoder model comprises:

a text embedding model configured to process the source text string to generate a hidden representation;

a tagging model configured to assign a respective tag to each of the source tokens in the source text string, the respective tag for each source token indicating whether or not such source token is included in the subset of the plurality of source tokens to be maintained for the output text string; and a pointer model configured to generate the ordering of the subset of the plurality of source tokens to be maintained for the output text string based at least in part on the hidden representation and the respective tag assigned to each of the source tokens.

3. The computer system of claim 1, wherein each of the encoder model and the decoder model comprises a transformer neural network.

4. The computer system of claim 3, wherein at least the transformer neural network in the decoder model comprises a T5 pre-trained transformer neural network that has been pre-trained to insert missing spans.

5. The computer system of claim 1, wherein the decoder model has been pre-trained with a denoising objective.

6. The computer system of claim 1, wherein the encoder model comprises one or more Sinkhorn layers that normalize over both rows and columns of an intra-pointer attention.

7. The computer system of claim 1, wherein the decoder model being configured to first predict the position token comprises repurposing one or more special span_i tokens to indicate the position token indicating the position at which one or more of the additional tokens should be inserted into the intermediate text representation.

8. A computer-implemented method to train a text editing model, the method comprising:

obtaining, by a computing system comprising one or more computing devices, a training example comprising a source text string and target text string;

processing, by the computing system, the source text string with the text editing model to generate an output text string, wherein processing the source text string with the text editing model to generate the output text string comprises:

processing, by the computing system, the source text string in a non-autoregressive manner with an encoder model of the text editing model to generate an intermediate text representation, wherein the source text string comprises a plurality of source tokens, and wherein the intermediate text representation indicates: (1) a subset of the plurality of source tokens to be maintained for the output text string and (2) an ordering of the subset of the plurality of source tokens to be maintained for the output text string; and processing, by the computing system, the intermediate text representation in an autoregressive manner with a decoder model of the text editing model to select one or more additional tokens to insert into the subset of the plurality of source tokens to generate the output text string;

wherein the encoder model is configured to process the source text string in the non-autoregressive manner to generate the intermediate text representation without indicating a position at which one or more of the additional tokens should be inserted into the intermediate text representation;

evaluating, by the computing system, a combined loss function that respectively compares (i) each of: a set of ground truth labels for the source tokens to be maintained, a ground truth ordering, and the target text string respectively to (ii) each of: the subset of the plurality of source tokens, the ordering of the subset of the plurality of source tokens, and the output text string; and modifying, by the computing system, one or more parameters of the text editing model based on the combined loss function.

9. The computer-implemented method of claim 8, wherein the encoder model comprises:

a text embedding model configured to process the source text string to generate a hidden representation;

a tagging model configured to assign a respective tag to each of the source tokens in the source text string, the respective tag for each source token indicating whether or not such source token is included in the subset of the plurality of source tokens to be maintained for the output text string; and a pointer model configured to generate the ordering of the subset of the plurality of source tokens to be maintained for the output text string based at least in part on the hidden representation and the respective tag assigned to each of the source tokens.

10. The computer-implemented method of claim 8, wherein the combined loss function comprises a tagging loss term that evaluates a probability of the encoder model outputting the set of ground truth labels for the source tokens to be maintained for the output text string.

11. The computer-implemented method of claim 8, wherein the combined loss function comprises a pointing loss term that compares the ordering with the ground truth ordering.

12. The computer-implemented method of claim 8, wherein the combined loss function comprises an insertion loss term that evaluates a probability of the decoder model outputting a set of ground truth tokens to be included in the output text string.

13. The computer-implemented method of claim 8, wherein each of the encoder model and the decoder model comprises a transformer neural network.

14. The computer-implemented method of claim 8, wherein the encoder model comprises one or more Sinkhorn layers that normalize over both rows and columns of an intra-pointer attention.

15. One or more non-transitory computer readable media that store:

a machine-learned text editing model configured to receive and process a source text string to generate an output text string, the output text string comprising an edited version of the source text string, the machine-learned text editing model comprising:

an encoder model configured to process the source text string in a non-autoregressive manner to generate an intermediate text representation, wherein the source text string comprises a plurality of source tokens, and wherein the intermediate text representation indicates: (1) a subset of the plurality of source tokens to be maintained for the output text string and (2) an ordering of the subset of the plurality of source tokens to be maintained for the output text string; and a decoder model configured to process the intermediate text representation in an autoregressive manner to first predict a position token indicating a position at which one or more additional tokens should be inserted into the intermediate text representation and then to second select the one or more additional tokens to insert into the subset of the plurality of source tokens at the position to generate the output text string;

wherein the encoder model is configured to process the source text string in the non-autoregressive manner to generate the intermediate text representation without indicating the position at which one or more of the additional tokens should be inserted into the intermediate text representation.

16. The one or more non-transitory computer readable media of claim 15, wherein the encoder model comprises:

a text embedding model configured to process the source text string to generate a hidden representation;

a tagging model configured to assign a respective tag to each of the source tokens in the source text string, the respective tag for each source token indicating whether or not such source token is included in the subset of the plurality of source tokens to be maintained for the output text string; and a pointer model configured to generate the ordering of the subset of the plurality of source tokens to be maintained for the output text string based at least in part on the hidden representation and the respective tag assigned to each of the source tokens.

17. The one or more non-transitory computer readable media of claim 15, wherein each of the encoder model and the decoder model comprises a transformer neural network.

18. The one or more non-transitory computer readable media of claim 17, wherein at least the transformer neural network in the decoder model comprises a T5 pre-trained transformer neural network that has been pre-trained to insert missing spans.

19. The one or more non-transitory computer readable media of claim 18, wherein the decoder model comprises a single T5 decoder transformer layer.

20. The one or more non-transitory computer-readable media of claim 15, wherein the encoder model comprises one or more Sinkhorn layers that normalize over both rows and columns of an intra-pointer attention.

* * * * *